April 19, 1960  F. J. MELGES  2,933,304
LETTER WEIGHER
Filed April 18, 1955
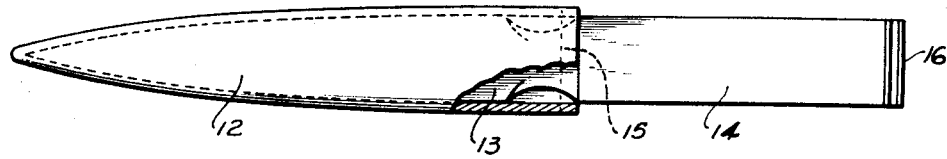
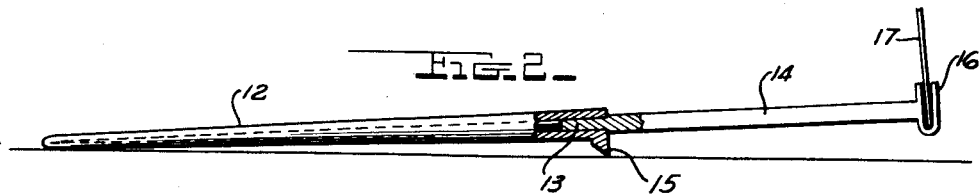
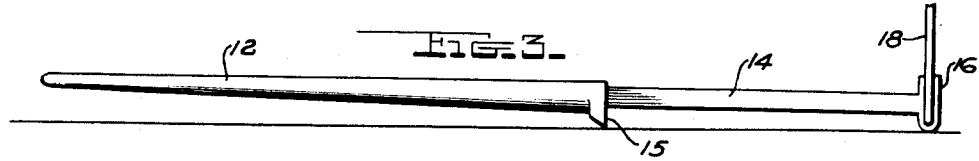
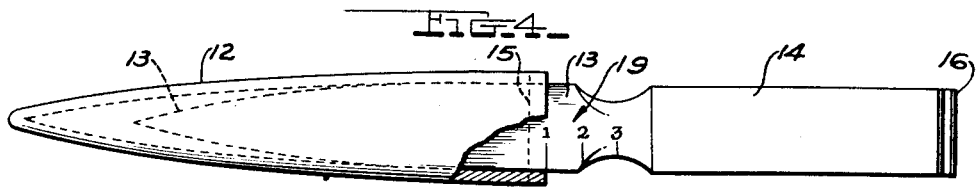
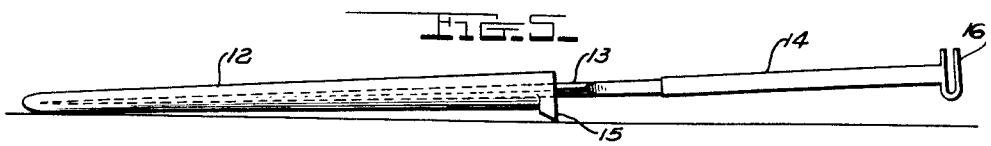
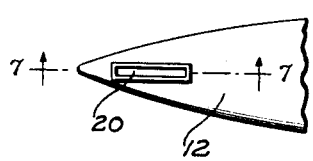
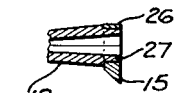
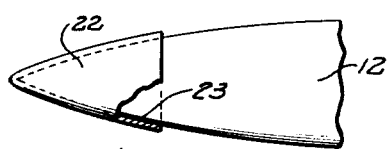
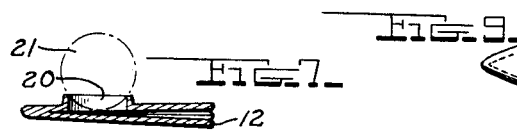
INVENTOR
F. J. Melges
BY Roy A. Plant
ATTORNEY

United States Patent Office 2,933,304
Patented Apr. 19, 1960

2,933,304

LETTER WEIGHER

Frederick J. Melges, Battle Creek, Mich.

Application April 18, 1955, Serial No. 501,799

3 Claims. (Cl. 265—53)

The present invention relates broadly to opening devices, and in its specific phases to a letter opener having a sheath or scabbard, which, when the two are assembled, can be used as a letter weighing scale.

Letter openers of the type merely having a handle and a projecting blade have long been available. More recently, an opener of this general type has been devised having a fulcrum and a letter holder, in fixed location relative to each other, which adapts it for checking a single weight of a letter to be mailed, for instance an ounce, to avoid the use of too little postage. So far as I am aware no letter opener of this type has been devised with a sheath. By using a sheath it can be made to serve the triple purpose of protecting the letter opening blade while at the same time providing adjustable weighing capability, and an extensive area for advertising matter if the article is to be given to customers and prospective customers by manufacturers or others. It was a recognition of these and other shortcomings in the prior letter openers which led to the conception and development of the present invention.

Accordingly among the objects of the present invention is the provision of a novel letter opener and sheath assembly in which the opener and sheath cooperate with each other to provide a fulcrum and a letter holder for combined use in checking the weight of a letter for the application of proper postage.

Another object is to provide such an assembly in which the fulcrum is on the sheath, and the letter holder is on the handle of the letter opener.

Yet another object is to provide for varying the distance between the fulcrum and the letter holder to adjust the assembly for letters of different weight and thus indicate with suitable graduation markings the letter weight for which postage must be provided.

A further object is to provide an assembly in which the aforesaid adjustment is effected by simply sliding the blade more or less into the sheath, said blade being provided with weight graduation markings, for instance an ounce scale.

A further object is to use a sheath or scabbard as a weight member for a letter weighing form of letter opener assembly.

A still further object is to make novel provision whereby weight may be added to the tip of the sheath.

Yet another object is to provide a simple and inexpensive yet highly attractive, desirable, and effective letter opening and weighing article which may be expeditiously manufactured from materials such as metal or plastic and profitably marketed at a fair price.

Still further objects and advantages of the present invention will appear as the description proceeds.

To the accomplishment of the foregoing and related ends, the invention, then, consists of the means hereinafter fully described and particularly pointed out in the claims, the annexed drawing and the following description setting forth in detail certain means for carrying out the invention, such disclosed means illustrating, however, but several of various ways in which the principle of the invention may be used.

In the accompanying drawing:

Figure 1 is a top plan view, partly broken away and in section, showing one form of the invention.

Figure 2 is an edge view of the device shown in Figure 1, partly broken away and in section, showing an underweight letter in the holder.

Figure 3 is a similar view showing an overweight letter in the holder and the device thereby tilted from its normal position.

Figure 4 is a view similar to Figure 1 but showing a form of the invention which is adjustable for weighing letters of different weight.

Figure 5 is an edge view of the device shown in Figure 4.

Figure 6 is a fragmentary plan view showing a seat in the tip of the sheath which may be provided if desired to receive a coin or other weight.

Figure 7 is a sectional view on line 7—7 of Figure 6, looking in the direction of the arrows.

Figure 8 is a fragmentary plan view showing a special tip which may be provided to add weight to the tip of the sheath.

Figure 9 is a plan view showing another form of tip.

Figure 10 is a detail sectional view showing another way of equipping the sheath with a fulcrum.

Preferences of a sheath including letter opener assembly have been disclosed in the drawing and will be rather specifically described, but it is to be understood that variations may well be made within the scope and spirit of the invention as thus set forth.

An elongated sheath 12 is provided for receiving a blade 13 having a handle 14, said blade and handle constituting a letter opener when withdrawn from said sheath. The open end of the sheath 12 is provided at its lower side with a transverse, relatively sharp-edged, fulcrum 15 to rest on a desk top or other suitable supporting surface, and the rear end of the handle 14 is provided with a U-shaped holder 16 to receive a letter in readiness for determining whether same is too heavy for a given amount of postage.

In Figures 1, 2 and 3, the parts are so related that when the blade 13 is fully within the sheath 12 the assembly will tilt upon the fulcrum 15, as shown in Figure 2, to normally elevate the letter holder 16. Moreover, the relation is such that a letter 17 placed in the holder 16 will not tilt the assembly in the other direction unless it weighs one ounce, or more. See the position of the letter opener, Figure 3, effected by the insertion of a one ounce, or heavier, letter 18. It is thus easily determined whether postage for one ounce will suffice, or if more is needed. Figures 4 and 5 show how the assembly may be manufactured so as to be adjustable for letters of different weights, say for instance from one ounce to four ounces. The parts are so related that when the blade 13 is fully within the sheath 12, a more-than-four-ounce letter in the holder 16 is required to tilt the assembly from its normal position. Adjustment for lesser weights is attained by outward sliding of the blade 13 to the proper extent, as indicated by an ounce scale 19 on said blade 13, said scale preferably being readable as alined with the open end of the sheath 12.

If desired, the tip of the sheath 12 may have a seat 20 (Figures 6 and 7) to receive a predetermined coin or other weight 21, thereby adapting the asembly for weighing heavier letters.

A special tip 22 (Figure 8) may be used if desired to add weight to the tip end of said sheath, said tip 22 having a recess 23 for receiving the tip end of said sheath 12.

A tip 24 (Figure 9) could well be used instead of the tip 22 of Figure 8, said tip 24 having a seat 25 corresponding to the seat 20 of Figures 6 and 7.

The letter holder 16 may be integral with the handle 14, or formed as a separate piece and suitably secured in place, and it is intended that the drawing be considered as diagrammatically showing same. Similarly, the fulcrum 15 may be integral with the sheath 12, or formed separately and appropriately secured. For instance in Figure 10, an attaching band 26 is provided for the fulcrum 15, said band being secured around a reduced rear end 27 of the sheath 12.

From the foregoing, it will be seen that a novel and advantageous letter opening and weighing assembly has been provided for attaining the desired ends. However, attention is again invited to the possibility of making variations in the assembly without departing from the spirit and scope of the invention as specifically set forth.

Other modes of applying the principle of my invention may be employed instead of those explained, change being made as regards the apparatus herein disclosed, provided the means stated by any of the following claims or the equivalent of such stated means be employed.

I therefore particularly point out and distinctly claim as my invention:

1. A mail handling assembly in the form of a postal scale having a beam formed in two sections, one section being in the form of a sheath for telescoping onto the other section, said sheath being removable from said other section which is in the form of a blade with handle and wherein said blade fits and is telescopable into said sheath, said sheath having a fulcrum crosswise of same at its blade receiving end and said handle, when the assembly is in letter weighing position, having a letter holding end portion in the form of a substantially vertical, open-top, relatively deep and narrow slot at its free end, said blade carrying graduations at spaced intervals at the handle end of same and readable at the point of emergence of said blade from said sheath; whereby said graduations act as a guide during removal of said blade from said sheath in predetermined amounts to enable the determination of the weight of different letters by balancing over a predetermined weight range when held upright in said slot at the free end of said handle and additional weighing means on the end of said sheath having an upwardly open recess for holding a removable weight for varying the weighing capacity of the assembly.

2. A postal scale in the form of a letter opener assembly comprising a beam formed in two sections, one section comprising an open-ended sheath and the other section comprising a flat blade reciprocably received in said sheath and including a handle projecting longitudinally therefrom, said sheath including a transverse fulcrum at the open end on one side of said sheath, the combined weights of said blade when disposed in said sheath and said sheath disposed on one side of said fulcrum being a calculated value greater than the weight of said handle disposed on the other side of said fulcrum, said handle including letter holding means at its terminal and whereby different weight letters may be retained thereat to overcome the calculated value to determine if a letter has a weight greater than said calculated value, said sheath including additional calculated weighing means on its terminal end comprising a tip element removably received on the terminal end of said sheath.

3. A postal scale in the form of a letter opener assembly comprising a beam formed in two sections, one section comprising an open-ended sheath and the other section comprising a flat blade reciprocably received in said sheath and including a handle projecting longitudinally therefrom, said sheath including a transverse fulcrum at the open end on one side of said sheath, the combined weights of said blade when disposed in said sheath and said sheath disposed on one side of said fulcrum being a calculated value greater than the weight of said handle disposed on the other side of said fulcrum, said handle including letter holding means at its terminal end whereby different weight letters may be retained thereat to overcome the calculated value to determine if a letter has a weight greater than said calculated value, said sheath including additional weight means comprising an upwardly opening recess on the terminal end of said sheath for receiving a weight element therein.

References Cited in the file of this patent

UNITED STATES PATENTS

| 1,318,595 | Richie | Oct. 14, 1919 |
| 2,040,037 | Wily | May 5, 1936 |
| 2,502,680 | Stewart | Apr. 4, 1950 |
| 2,507,019 | Johnson | May 9, 1950 |

FOREIGN PATENTS

| 504,103 | Germany | Dec. 22, 1928 |
| 865,216 | Germany | Feb. 2, 1953 |
| 424,548 | Great Britain | Feb. 22, 1934 |